United States Patent [19]

Hirano et al.

[11] Patent Number: 5,372,323
[45] Date of Patent: Dec. 13, 1994

[54] FISHING REEL WITH ONE-WAY BRAKE MECHANISM

[75] Inventors: Kazuo Hirano; Eiji Shinohara; Takashi Higashimoto, all of Tokyo, Japan

[73] Assignee: Daiwa Seiko, Inc., Tokyo, Japan

[21] Appl. No.: 4,246

[22] Filed: Jan. 14, 1993

[30] Foreign Application Priority Data

Jan. 30, 1992 [JP] Japan ................... 4-009031
Sep. 7, 1992 [JP] Japan ................... 4-068836

[51] Int. Cl.$^5$ ............... A01K 89/027; A01K 89/033
[52] U.S. Cl. ................................................ 242/299
[58] Field of Search ............... 242/298, 299, 300, 263, 242/260, 259, 257; 188/82.3, 82.34, 265

[56] References Cited

U.S. PATENT DOCUMENTS

| 615,526 | 12/1898 | Brosnaham | 242/299 X |
|---|---|---|---|
| 1,554,786 | 9/1925 | Case | 242/299 X |
| 2,271,883 | 2/1942 | Bannister | 242/257 X |
| 4,474,339 | 10/1984 | Sato | 242/300 |
| 4,522,354 | 6/1985 | Sato et al. | 242/299 |
| 5,020,738 | 6/1991 | Yamaguchi | 242/298 |
| 5,178,343 | 1/1993 | Sato | 242/298 X |
| 5,193,763 | 3/1993 | Sakaguchi | 242/261 X |
| 5,221,057 | 6/1993 | Yoshikawa | 242/299 X |

FOREIGN PATENT DOCUMENTS 64-38963 8/1989 Japan.
64-38964 8/1989 Japan.

*Primary Examiner*—Daniel P. Stodola
*Assistant Examiner*—Michael R. Mansen
*Attorney, Agent, or Firm*—Longacre & White

[57] ABSTRACT

In the fishing reel, a one-way brake is interposed between a reel main body and a drive shaft which is rotatable in linking with the rotation of a handle, switch-over members and capable of engaging the one-way brake with the drive shaft or disengaging the one-way brake from the drive shaft are interposed between the drive shaft and one-way brake, and an operation member for performing the switching operation between the engagement and disengagement of the switch-over members is disposed in such a manner that it can be operated from outside of the reel main body. It is possible to provide a simple and highly reliable fishing reel which is switchable in operation such that in one operation it prevents reversed rotation with the degree of play reduced and in the other operation it allows rotation in both forward and reversed directions as need arises.

12 Claims, 13 Drawing Sheets

FISHING REEL WITH ONE-WAY BRAKE MECHANISM

BACKGROUND OF THE INVENTION

1. Field of the Invention

The present invention relates to a fishing reel which is capable of switching over its operations, that is, which in one operation allows a drive shaft to be rotated in one direction while prevents the drive shaft from rotating in the other direction and, in the other operation, allows the drive shaft to be rotated in both directions.

2. Description of Related Art

Conventionally, in Japanese Utility Model Publication No. 64-38964 of Showa, there is disclosed a fishing reel in which a so-called one-way clutch is used as a reversing preventive device of the fishing reel to allow a drive shaft to be rotated in one direction, and prevent the drive shaft from rotating in the other direction.

Also, in Japanese Utility Model Publication No. 64-38963 of Showa, there is disclosed a fishing reel using a one-way clutch, which in one operation allows a drive shaft to be rotated in one direction while prevents the drive shaft from rotating in the other direction and, in the other operation allows the drive shaft to be rotated in both directions.

The former conventional fishing reel provides a small degree of play in the rotation in the other direction (reversed rotation) but does not have an on/off switch-over function to allow the drive shaft to be rotated in both directions. Due to this, the structure of this fishing reel is simple but is inconvenient in use.

On the other hand, the latter conventional fishing reel has an on/off switch-over function and includes on the outer periphery of the one-way clutch a ratchet wheel with which an engaging pawl can be removably engaged.

In the structure of the latter conventional fishing reel, when the drive shaft is rotated in one direction (that is, in a winding rotation), the engaging pawl is engaged with the ratchet wheel so that the ratchet wheel is prevented from rotating together with the drive shaft, and the engaging pawl is engaged with the ratchet wheel by the energizing force of a spring so that the engaging pawl can be disengaged from the ratchet wheel as required. Due to use of the spring, when a reel handle is suddenly rotated, the ratchet wheel can be rotated together with the drive shaft against the energizing force of the spring. If the ratchet wheel is rotated together with the drive shaft due to the unstable engaging and disengaging operations, then the degree of play in the reversed rotation is increased, which causes a fishing line to be loosened when the fishing reel is operated. Also, the additional provision of the ratchet wheel, engaging pawl and the like complicates the structure of the latter conventional fishing reel.

SUMMARY OF THE INVENTION

The present invention aims at eliminating the drawbacks found in the above-mentioned conventional fishing reels. Accordingly, it is an object of the invention to provide a simple and highly reliable fishing reel which prevents rotation in the reversed rotation with the degree of play reduced, and is capable of switching over its operation so that the rotation thereof is allowed in both directions as required.

In attaining the above object, according to the invention, there is provided a fishing reel in which a one-way brake is interposed between a reel main body and a drive shaft to be rotatable in linking with the rotation of a handle, a switch-over member to allow the one-way brake to be engaged with or disengaged from the drive shaft is interposed between the drive shaft and the one-way brake, and an operation member to perform the switch-over operation of the engagement or disengagement of the switch-over member is provided in such a manner that it can be operated from outside of the reel main body.

The operation member is operated from outside to operate the switch-over member on the drive shaft, the one-way brake is engaged through the switch-over member with the drive shaft which can be rotated in linking with the rotation of the handle, and the handle is then rotated in the forward rotation direction. As a result of this, the drive shaft is rotated in a direction in which the one-way brake can be rotated. Also, if the fishing line is pulled to drive the drive shaft in the reversed direction, then the reversed rotational direction coincides with a direction in which the one-way brake cannot be rotated and, for this reason, the reversed rotation of the drive shaft can be stopped at once by the wedge operation of the one-way brake with a small degree of play.

On the other hand, if the switch-over member is operated by means of the operation member to thereby disengage the one-way brake from the drive shaft, then the drive shaft is free to rotate in both of the forward and reversed directions thereof.

According to the structure of the present invention, the switch-over member may be operated simply by means of the operation member and thus there is proposed a mechanism which is simple and highly reliable.

DETAILED DESCRIPTION OF THE PREFERRED EMBODIMENTS

Figure 1:
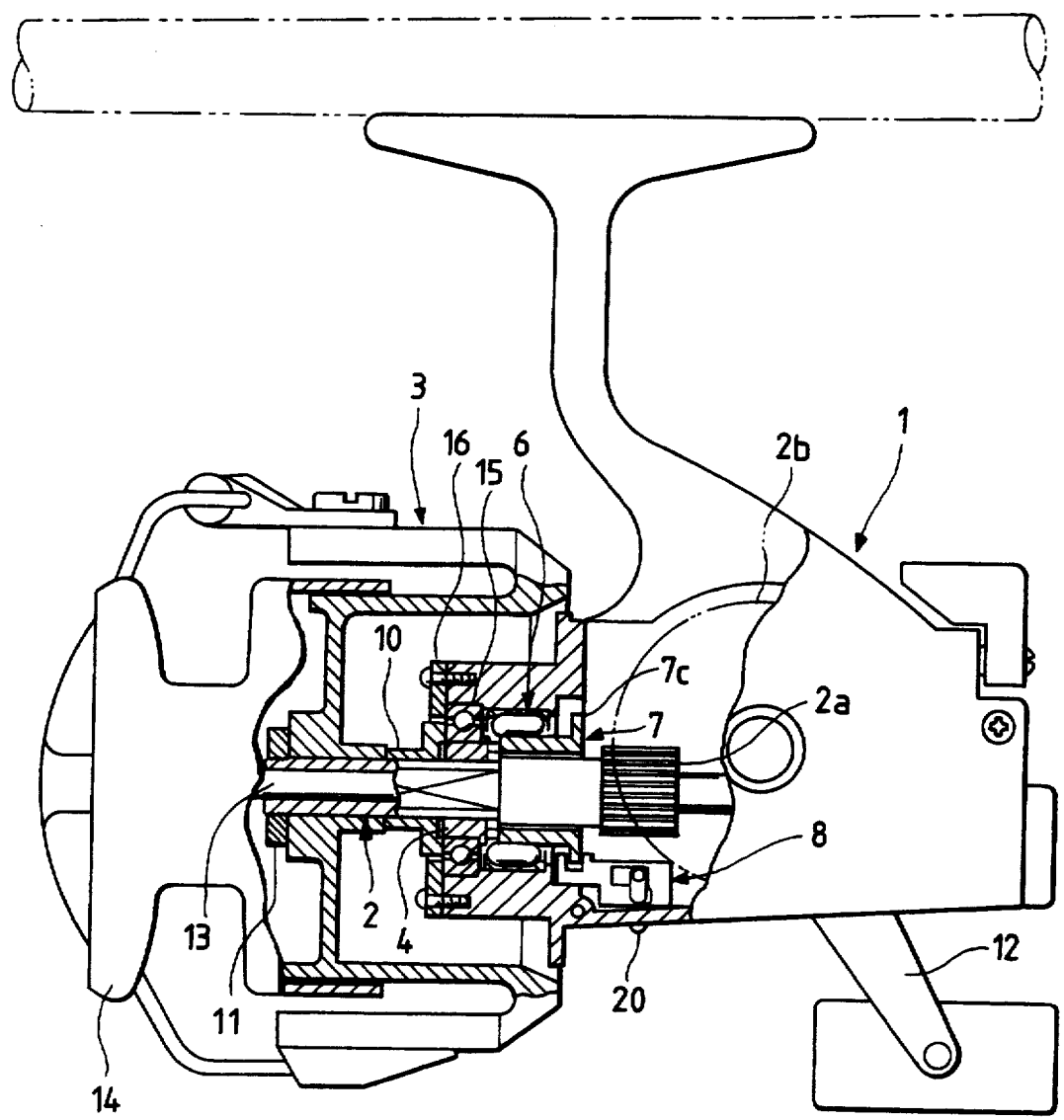
FIG. 1 is a sectional side view of main portions of a spinning reel which is a first embodiment of a fishing reel according to the invention.
Figure 2:
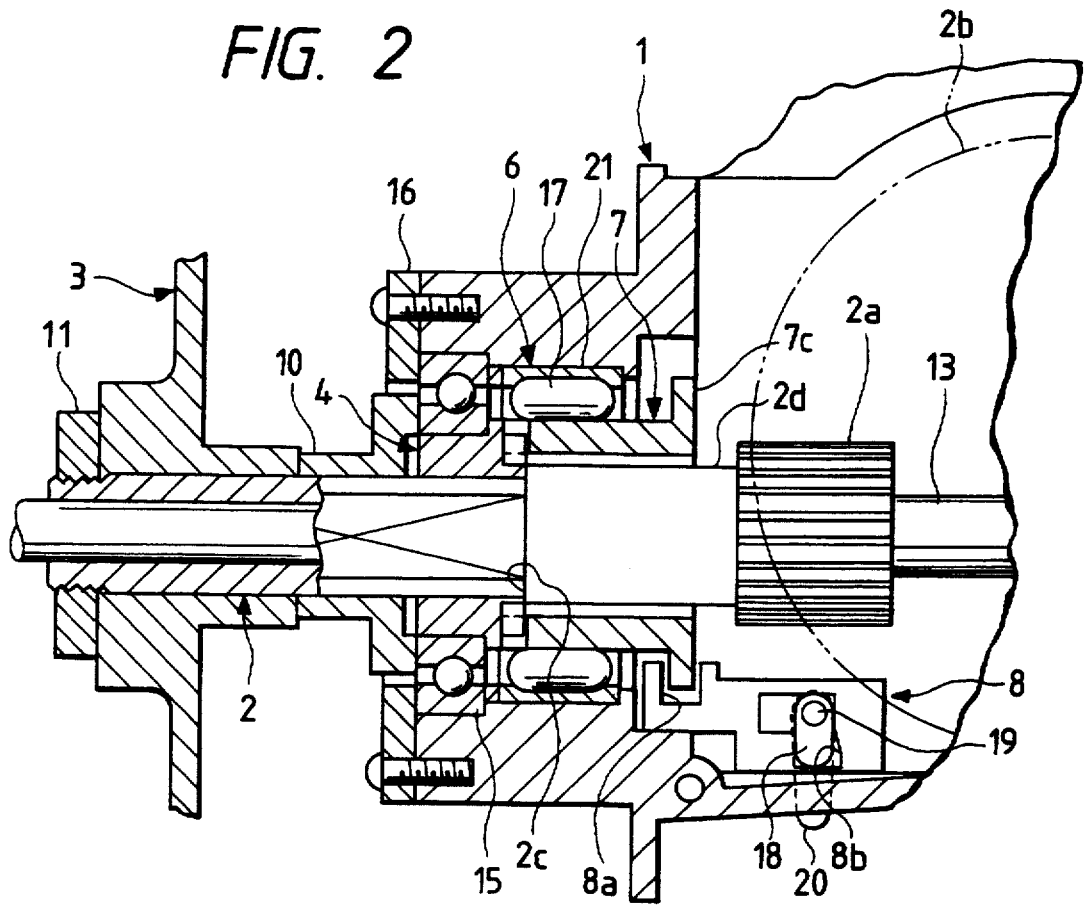
FIG. 2 is an enlarged section view of main portions of the spinning reel shown in FIG. 1.
Figure 3:
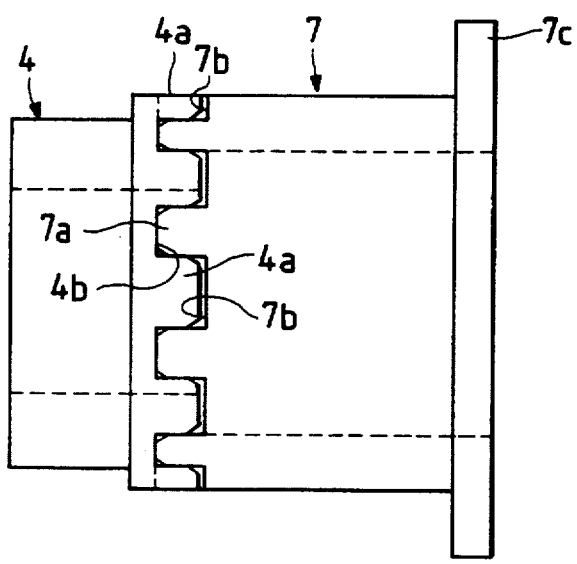
FIG. 3 is an enlarged section view of a switch-over member shown in FIG. 1.
Figure 4:
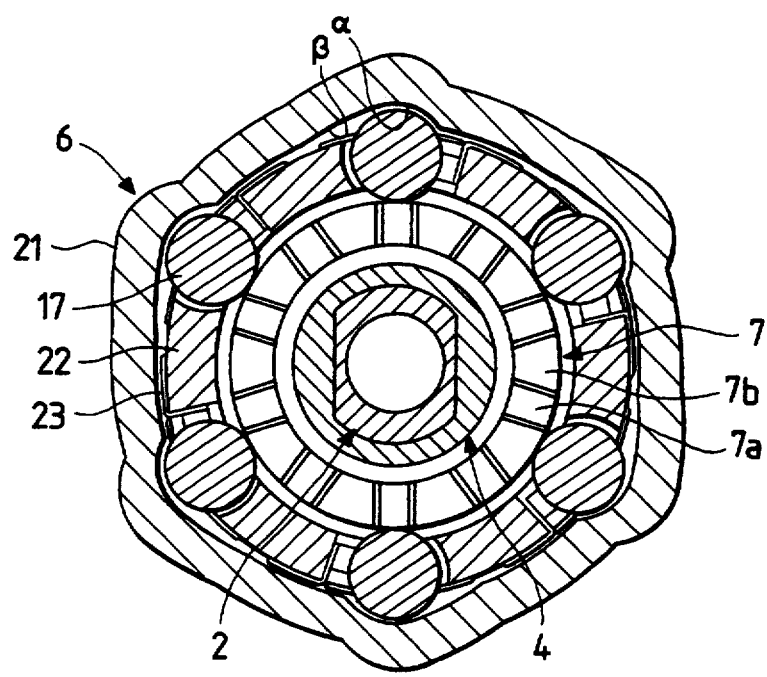
FIG. 4 is an enlarged transverse section view of main portions of the fishing reel shown in FIG. 1 including a one-way brake, viewed from the front portion of the fishing reel.
Figure 5:
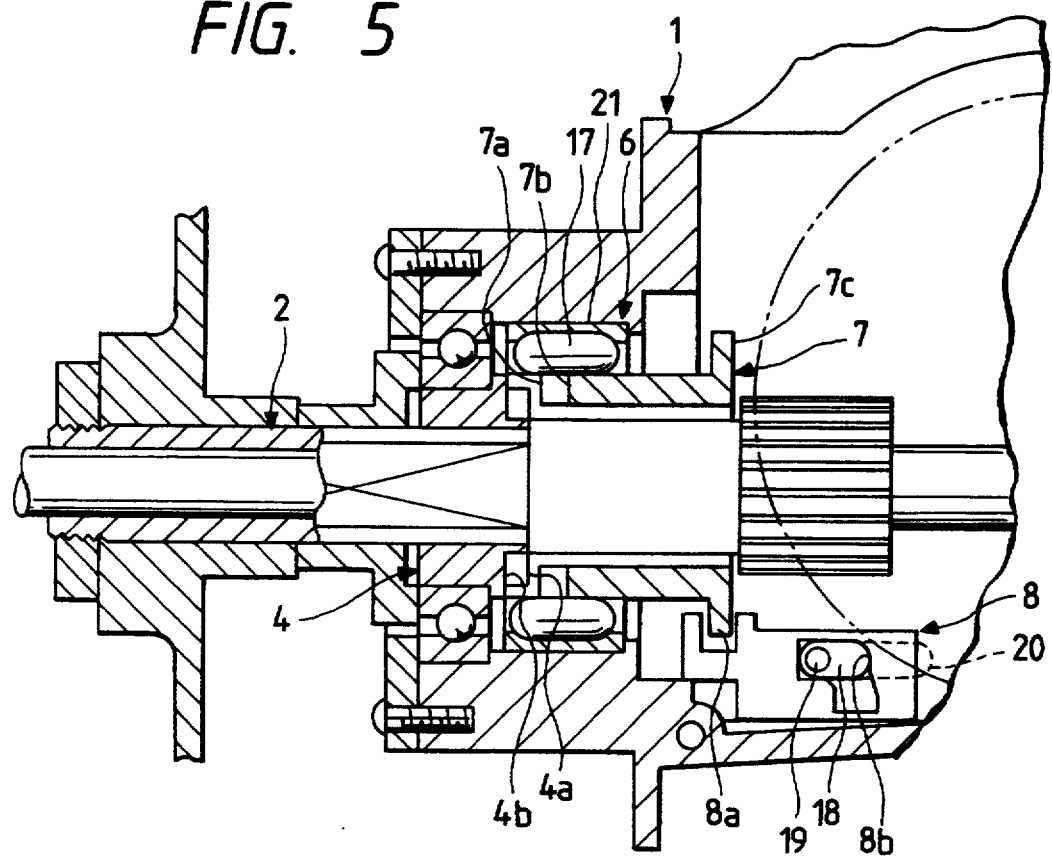
FIG. 5 is an enlarged section view of main portions of the fishing reel shown in FIG. 1, showing a state in which a rotor can be rotated in the reversed direction.

Description will be hereinafter given in further detail of the invention by way of the preferred embodiments thereof with reference to the accompanying drawings. FIGS. 1 to 5 show a first embodiment according to the invention. In particular, FIG. 1 is a sectional side view of main portions of a spinning reel for fishing according to the invention, FIG. 2 is an enlarged section view of main portions of the first embodiment, showing a state in which a rotor is prevented from rotating in the reversed direction, FIG. 3 is a side view of a switch-over member employed in the first embodiment, FIG. 4 is a transverse section view of main portions of the spinning reel including a one-way brake, viewed from the front portion to the rear portion of the spinning reel, and FIG. 5 is an enlarged section view of main portions of the first embodiment, showing a state in which a rotor can be rotated in the reversed direction.

In the spinning reel for fishing shown in FIGS. 1 and 2, a flanged collar 10 is fitted to the outer periphery of a cylindrical drive shaft 2 which is projected out on the front side of a reel main body 1, and a rotor 3 is non-rotatingly fitted to the cylindrical drive shaft 2 in front of the collar 10 and is fixed thereto by a nut 11. The rotor 3 is supported in such a manner that it can be rotated in linking with the rotation of a handle 12 by means of a pinion 2a disposed on the cylindrical drive shaft 2 and a drive gear 2b provided integrally with another cylindrical drive shaft, the drive gear 2b being in mesh with the pinion 2a.

A spool shaft 13 is inserted into and projected out from the cylindrical drive shaft 2, and a spool 14 is supported on the leading end portion of the spool shaft 13. The spool 14 can be reciprocated back and forth in linking with the rotation of the handle 12.

A bearing 15 is disposed within the front portion of the reel main body 1 in such a manner that it is prevented from slipping off by a check plate 16. Between the bearing 15 and the outer periphery of the cylindrical drive shaft 2 there is interposed a rotation-side switch-over member element 4 in such a manner that it is non-rotatingly fitted to the cylindrical drive shaft 2. The rotation-side switch-over member element 4 is fixed in the longitudinal direction by the bearing 15 and a stepped portion 2c provided in the cylindrical drive shaft 2 as shown in FIG. 2.

A one-way brake 6 of a radial type is fitted into and fixed to the inside portion of the reel main body 1 backward of the bearing 15. The one-way brake 6 of a radial type includes rod-shaped rolling members 17. An operation-side switch-over member element 7 is disposed inside the operation-side switch-over member element 7 and around the drive shaft 2. A clearance is formed between the inner periphery of the operation-side switch-over member element 7 and the outer periphery of the large diameter portion 2d of the cylindrical drive shaft 2.

The rotation-side switch-over member element 4 and operation-side switch-over member element 7, as shown in FIGS. 1 to 4, include raised and recessed portions, that is, engagement portions 4a, 4b and 7a, 7b, respectively. In particular, the engagement portion 4a corresponds to the engagement portion 7b in an engageable manner, while the engagement portion 4b corresponds to the engagement portion 7a in an engageable manner. The raised leading ends of the respective engagement portions are chamfered for smooth engagement.

The operation-side switch-over member element 7 includes a flange portion 7c on the other side thereof. Downwardly and outwardly of the flange portion 7c, there is provided an operation member 8. The operation member 8 is formed in a plate shape and includes a recessed portion 8a and a cam groove 8b. A cam 18 is disposed within the cam groove 8b and is fixed to a cam shaft 19. A knob 20 is mounted to the cam shaft 19 and extends out externally of the reel main body 1. In this structure, the cam 18 can be rotated by operating the knob 20, whereby the operation member 8 can be moved back and forth.

On the other hand, the flange portion 7c is disposed such that it is opposed to the recessed portion 8a. With the back and forth movement of the operation member 8, the flange portion 7c is pushed or pulled by the wall surface of the recessed portion 8a.

Also, the cam shaft 19 includes a click mechanism which is not shown.

The one-way brake 6 of a radial type, as shown in FIGS. 1, 2 and 4, includes an outer frame member 21, a holding member 22 formed of a synthetic resin, a plurality of rod-shaped rolling members 17 and a spring 23. The holding member 22 includes a plurality of through holes. A plurality of (6 pcs. in the illustrated embodiment) rod-shaped rolling members 17 are inserted into and held by the through holes of the holding member 22, and are also abutted against the outer periphery of the operation-side switch-over member element 7. Also, the outer frame member 21 includes in the inner peripheral surface thereof a free rotation area $\alpha$ which allows the rod-shaped rolling member 17 to rotate and a rotation preventive surface $\beta$ against which the rod-shaped rolling members 17 are abutted and are then prevented from rotating. Further, the rod-shaped rolling members 17 are pressed and energized by a spring 23 in a counter-clockwise direction in FIG. 4.

Description will be given below of the operation of the above-mentioned spinning reel for fishing. As shown in FIGS. 1 to 3, with the engagement portions 4a, 4b, 7a, 7b of the rotation-side and operation-side switch-over member elements 4 and 7 in engagement with each other, if the handle 12 is rotated in a direction in which a fishing line (not shown) is wound around the spool 14, then the cylindrical drive shaft 2, rotor 3, rotation-side switch-over member element 4 and operation-side switch-over member element 7 are respectively rotated clockwise (forwardly rotated) in FIG. 4. In this case, the rod-shaped rolling members 17 are situated in the free rotation area α of the outer frame member 21.

Next, if the fishing line (not shown) wound around the spool 14 is tugged by a fish and is played out from the spool, then the rotor 3 is rotated in the reversed direction, which reversed rotation tries to rotate the operation-side switch-over member element 7 counterclockwise (reversed rotation) in FIG. 4. If the operation-side switch-over member element 7 is rotated in the reversed direction, then the rod-shaped rolling members 17 of the one-way brake 6 are caused to move from the free rotation area α of the outer frame member 21 to the rotation preventive surface β thereof, that is, are abutted against the rotation preventive surface β, so that the reversed rotation of the operation-side switch-over member element 7 can be prevented by means of the wedge operation of the rod-shaped rolling members 17. This in turn stops the reversed rotation of the rotor 3. Also, the degree of play in the reversed rotation generated due to the wedge operation of the rod-shaped rolling members 17 is small and, therefore, the reversed rotation of the rotor 3 can be stopped very quickly.

As shown in FIG. 5, if the knob 20 is rotated to move the operation member 8 backwardly and the operation-side switch-over member element 7 is moved apart from the rotation-side switch-over member element 4, then the rotational movements of the rotor 3, cylindrical drive shaft 2 and rotation-side switch-over member element 4 are not transmitted to the operation-side switch-over member element 7 and one-way brake 6, so that the wedge operation of the rod-shaped rolling members 17 of the one-way brake 6 for the reversed rotation prevention is not performed. As a result of this, the rotor 3, cylindrical drive shaft 2 and rotation-side switch-over member element 4 are now free to rotate in both of the forward and reversed directions.

Figure 6:
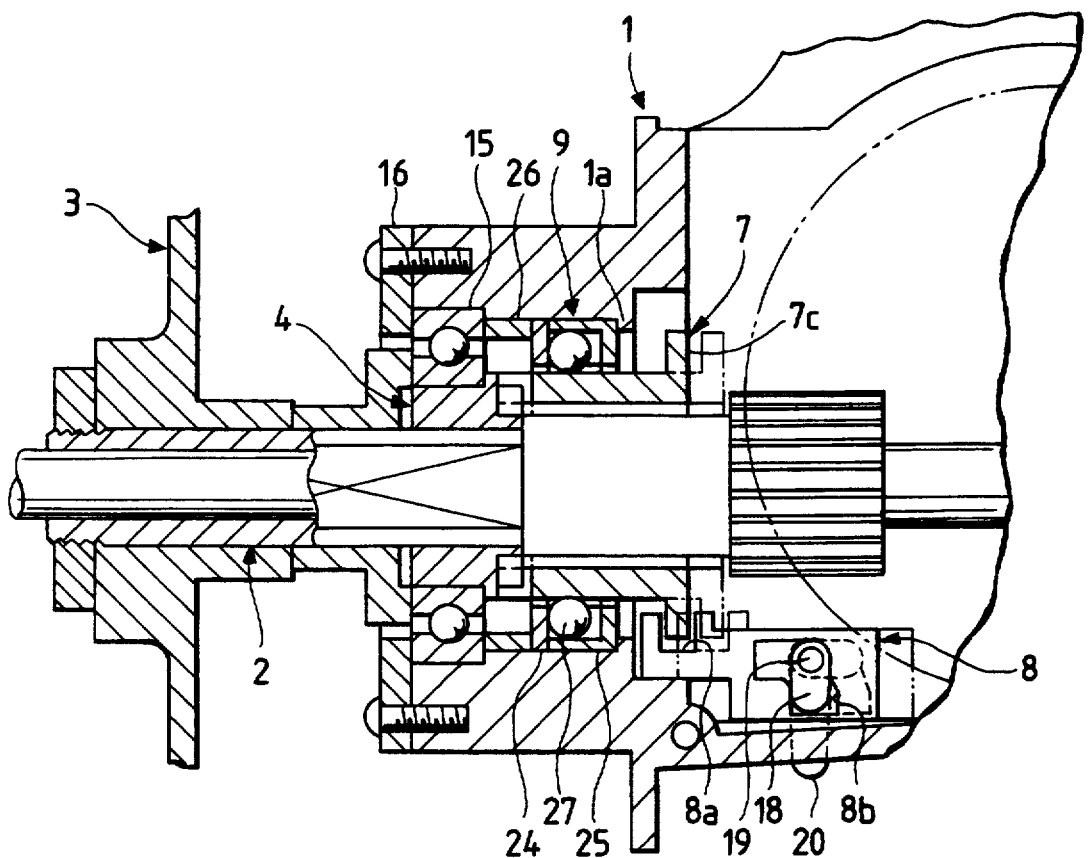
FIG. 6 is an enlarged section view of main portions of a spinning reel which is a second embodiment of a fishing reel according to the invention.
Figure 7:
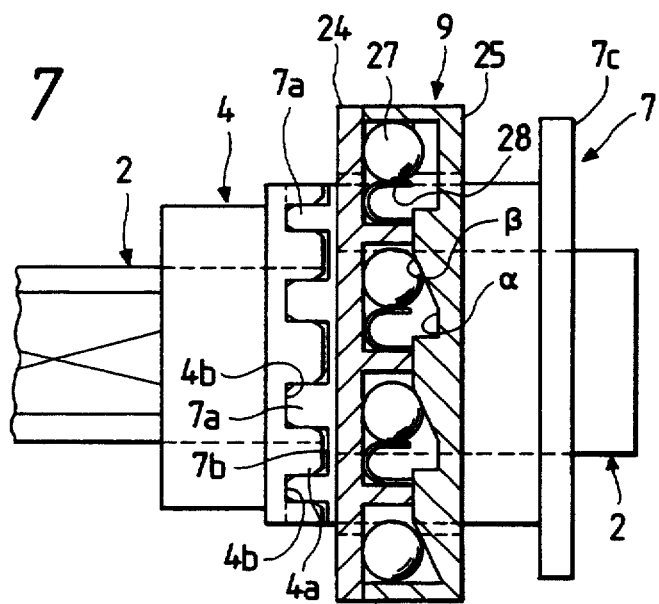
FIG. 7 is a section view of main portions of a one-way brake of a thrust type employed in the spinning reel shown in FIG. 6.

In FIGS. 6 and 7, there is shown a second embodiment of a fishing reel according to the invention, which is similar to the previously described first embodiment of the present invention except that the second embodiment uses a one-way brake 9 of a thrust type. In the one-way clutch 9 of a thrust type, two frame members 24 and 25 respectively opposing to each other in the axial direction of the one-way brake 9 are held and fixed at a given distance between a bearing 15 and a projection 1a of the reel main body 1 with a collar 26 between them. Within the two frame members 24 and 25 there are inserted a plurality of ball-shaped rolling members 27 and springs 28 to thereby construct the one-way brake 9 of a thrust type. The plurality of ball-shaped rolling members 27 are in contact with the outer periphery of the operation-side switch-over member element 7 and are pressed and energized in one side direction by the springs 28, respectively. The frame member 25 includes in the inner surface thereof a free rotation area α which allows the ball-shaped rolling members 27 to be rotated and a rotation preventive surface β which prevents the ball-shaped rolling members 27 from rotating when they are abutted against the rotation preventive surface β.

Description will be given below of the operation of the second embodiment of the invention. As shown in FIGS. 6 and 7, if the engagement portions 4a, 4b, 7a and 7b of the rotation-side and operation-side switch-over member elements 4 and 7 are in engagement with each other in such a manner as shown by solid lines and a handle is rotated in a direction in which a fishing line (not shown) is wound around the spool, then the cylindrical drive shaft 2, rotor 3, rotation-side switch-over member element 4 and operation-side switch-over member element 7 are rotated forwardly, respectively. In this case, the ball-shaped rolling members 27 are situated in the free rotation area α of the frame member 25 and, for this reason, the operation-side switch-over member element 7 and the like can be rotated freely.

Next, if the fishing line (not shown) wound around the spool is tugged by a fish and is played out from the spool, then the rotor 3 is rotated in the reversed direction, which tries to rotate the operation-side switch-over member element 7 in the reversed direction. If the operation-side switch-over member element 7 is rotated in the reversed direction, then the ball-shaped rolling members 27 of the one-way clutch 9 are moved from the position of the free rotation area α to the rotation preventive surface β, that is, they are abutted against the rotation preventive surface β, so that the reversed rotation of the operation-side switch-over member element 7 with respect to the frame members 24 and 25 can be prevented by means of the wedge operation of the ball-shaped rolling members 27. As a result of this, the reversed rotation of the rotor 3 is stopped. Also, since the degree of play of the ball-shaped rolling members 27 when they are rotated in the reversed direction is small, the reversed rotation of the rotor 3 can be stopped very quickly.

In FIG. 6, if the knob 20 is rotated to move the operation member 8 backwardly and the engagement portions of the rotation-side and operating-side switch-over member elements 4 and 7 are disengaged from each other to thereby move the operation-side switch-over member element 7 to a position shown by a two-dot chained line, then the rotational movements of the rotor 3, cylindrical drive shaft 2 and rotation-side switch-over member element 4 are not transmitted to the operation-side switch-over member element 7 and one-way brake 9, which disables the prevention of the reversed rotation due to the wedge operation of the ball-shaped rolling members 27 of the one-way brake 9. As a result of this, the rotor 3, cylindrical drive shaft 2 and rotation-side switch-over member element 4 can be freely rotated in both of the forward and reversed directions.

According to the fishing reel constructed in the above-mentioned manner, the degree of play can be reduced to thereby prevent the reversed rotation. Also, the present structure makes it possible to switch over two operations on the cylindrical drive shaft so that the rotor 3 can be rotated in both of the forward and reversed direction. Therefore, the present structure can improve the conventional combination of a ratchet wheel with an engagement pawl which is unstable in the engaging and disengaging operations due to use of a spring and is complicated in structure.

Figure 8:
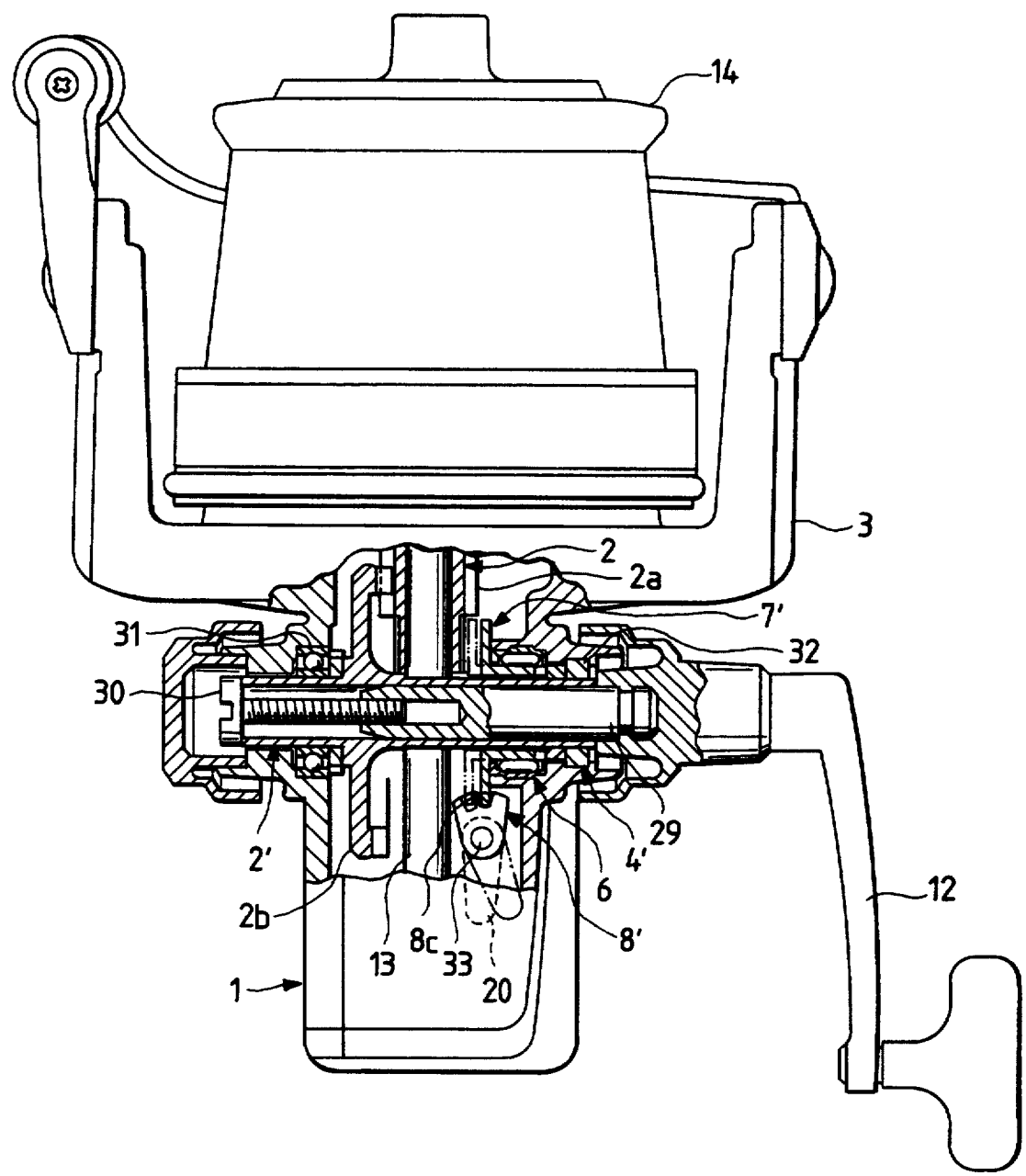
FIG. 8 is a sectional plan view of main portions of a spinning reel which is a third embodiment of a fishing reel according to the invention.
Figure 9:
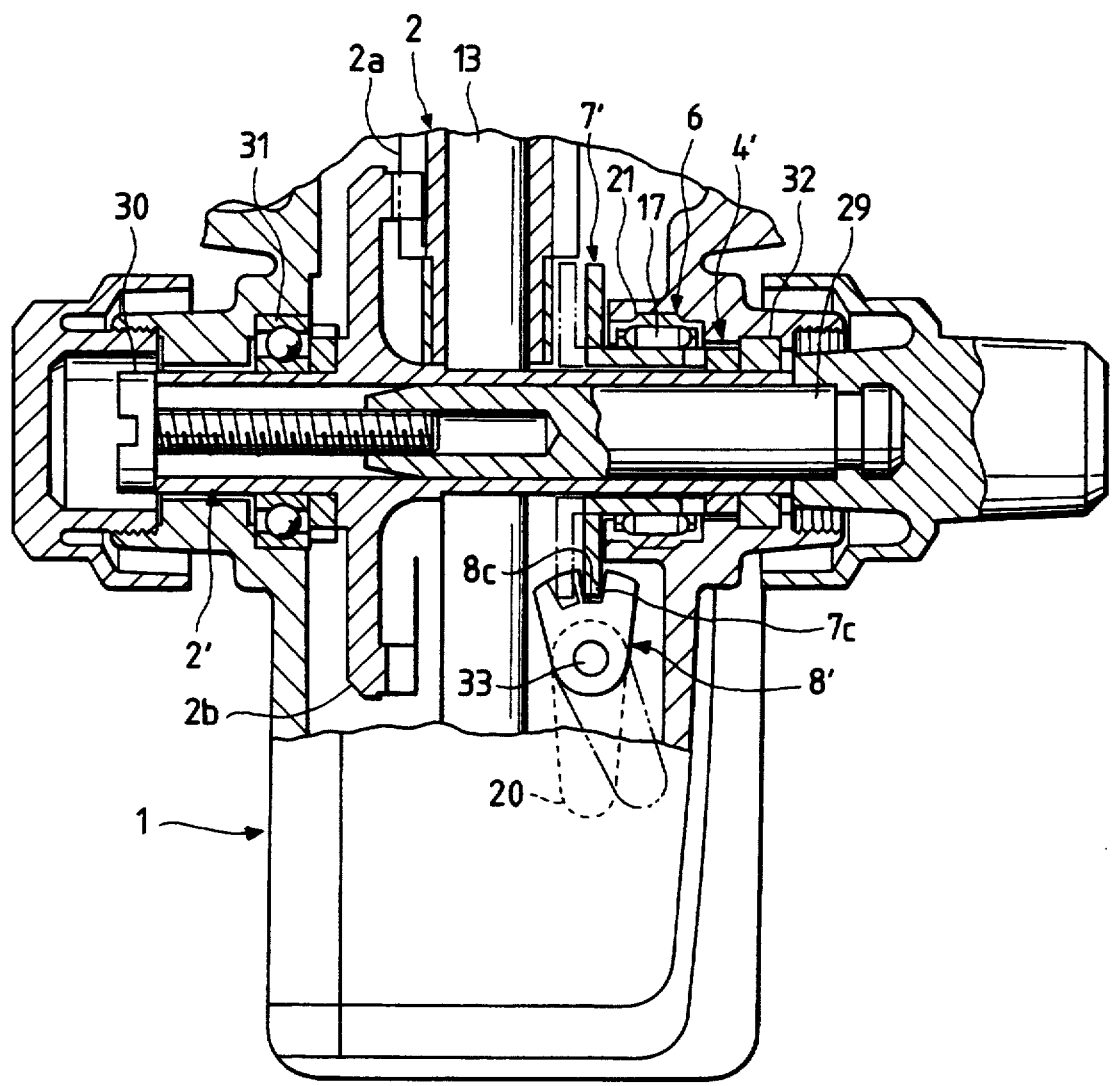
FIG. 9 is an enlarged section view of main portions of the spinning reel shown in FIG. 8.

Referring now to FIGS. 8 and 9, there is shown a third embodiment of a fishing reel according to the invention. In particular, FIG. 8 is a partially sectional plan view of a spinning reel for fishing and FIG. 9 is an enlarged view of main portions of the spinning reel for fishing shown in FIG. 8, illustrating a state in which a rotor is prevented from rotating in the reversed direction. In the third embodiment, a drive gear 2b is formed integrally with a cylindrical drive shaft 2' and is in mesh with a pinion 2a which is provided in another cylindrical drive shaft 2. A rotor 3 is mounted to the cylindrical drive shaft 2 similarly as in FIG. 1, and a spool 14 is supported on the leading end portion of a spool shaft 13 passing inside the cylindrical drive shaft 2.

A handle shaft 29 is fitted into the cylindrical drive shaft 2' in such a manner that it is prevented from rotating relative to the drive shaft 2' and the handle shaft 29 is fixed by a screw 30 such that it is prevented from slipping off out of position. One side portion of the cylindrical drive shaft 2' is supported by a bearing 31 disposed on one side wall of the reel main body 1 and is also supported by a bearing 32 disposed on the other side wall. A rotation-side switch-over member element 4' is non-rotatingly fitted to the outer periphery of the cylindrical drive shaft 2', the element 4' being located at the inner side relative to the bearing 32.

A one-way brake 6 of a radial type similar to that shown in FIG. 4 is fitted and fixed to the inner surface of the reel main body 1. An operation-side switch-over member element 7' is inserted inside the rod-shaped rolling members 17 of the one-way brake 16 of a radial type with a clearance remaining between the operation-side switch-over member element 7' and the outer periphery of the cylindrical drive shaft 2'.

The rotation-side switch-over member element 4' and operation-side switch-over member element 7', as shown in FIGS. 8 and 9 and in FIG. 3 which relates to the previously-described embodiment, are respectively formed with raised and recessed engagement portions 4a, 4b, 7a, 7b, and the raised leading end portions of the respective engagement portions being chamfered.

The operation-side switch-over member element 7' includes a flange portion 7c in the other side thereof. Downwardly and outwardly of the flange portion 7c in FIGS. 8 and 9, there is disposed an operation member 8'. The operation member 8' is formed in a plate shape and includes a recessed portion 8c. The flange portion 7c is disposed such that it is situated in the recessed portion 8c.

The operation member 8' is fixed to a shaft 33 to which there is mounted a knob 20 extending outwardly of the reel main body 1. The shaft 33 also includes a click mechanism which is not shown.

Next, description will be given below of the operation of the third embodiment of the invention. With the engagement portions 4a, 4b, 7a and 7b of the rotation-side switch-over member element 4' and operation-side switch-over member element 7' in engagement with each other, if the handle is rotated in a direction in which a fishing line is wound around the spool 14, then the cylindrical drive shaft 2', rotation-side switch-over member element 4', operation-side switch-over member element 7', cylindrical drive shaft 2 and rotor 3 are rotated in the forward direction respectively. In this case, the rod-shaped rolling members 17 of the one-way brake 6 are situated in the free rotation area α of the outer frame member 21, so that the operation-side switch-over member element 7' can be rotated.

Next, if the fishing line (not shown) wound around the spool 14 is tugged by a fish and is played out from the spool 14, then the rotor 3 is rotated in the reversed direction, which tries to rotate the operation-side switch-over member element 7' in the reversed direction. If the operation-side switch-over member element 7' is rotated reversely, then the rod-shaped rolling members 17 of the one-way brake 6 are moved from the positions thereof in the free rotation area α to the rotation preventive surface β, that is, are abutted against the rotation preventive surface β, so that the operation-side switch-over member element 7' is prevented from rotating in the reversed direction with respect to the outer frame members 21 due to the wedge operation of the rod-shaped rolling members 17. As a result of this, the reversed rotation of the rotor 3 is stopped. Also, due to the fact that the degree of play of the rod-shaped rolling members 17 is small during the reversed rotation, the reversed rotation of the rotor 3 can be stopped very quickly.

If the knob 20 is rotated in such a manner as shown by two-dot chained lines in FIGS. 8 and 9 to rotate the operation member 8', then the operation-side switch-over member element 7' is moved left in FIG. 9 by means of the flange portion 7c of the operation-side switch-over member element 7', so that the element 7' is disengaged from the rotation-side switch-over member element 4'. Thus, the rotational movements of the rotor 3, cylindrical drive shaft 2, cylindrical drive shaft 2' and rotation-side switch-over member element 4' are not transmitted to the operation-side switch-over member element 7' and one-way brake 6 and, therefore, the reversed rotation cannot be prevented by means of the wedge operation of the rod-shaped rolling members 17 of the one-way brake 6. As a result of this, the rotor 3, cylindrical drive shaft 2, cylindrical drive shaft 2' and rotation-side switch-over member element 4' are free to rotate in the forward direction as well as in the reversed direction.

Figure 10:
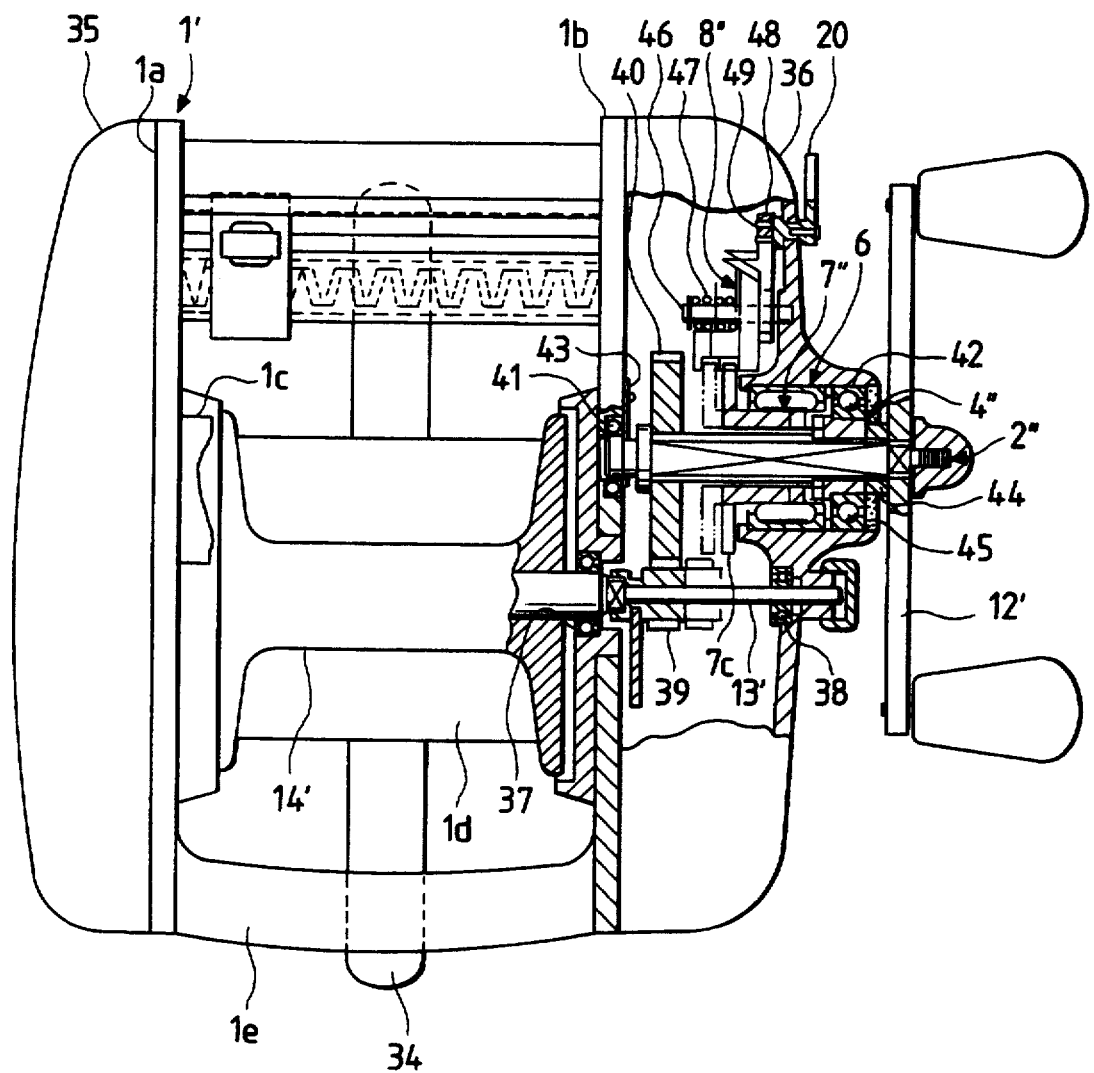
FIG. 10 is a sectional plan view of main portions of a fishing reel of a double bearing type which is a fourth embodiment of a fishing reel according to the invention.
Figure 11:
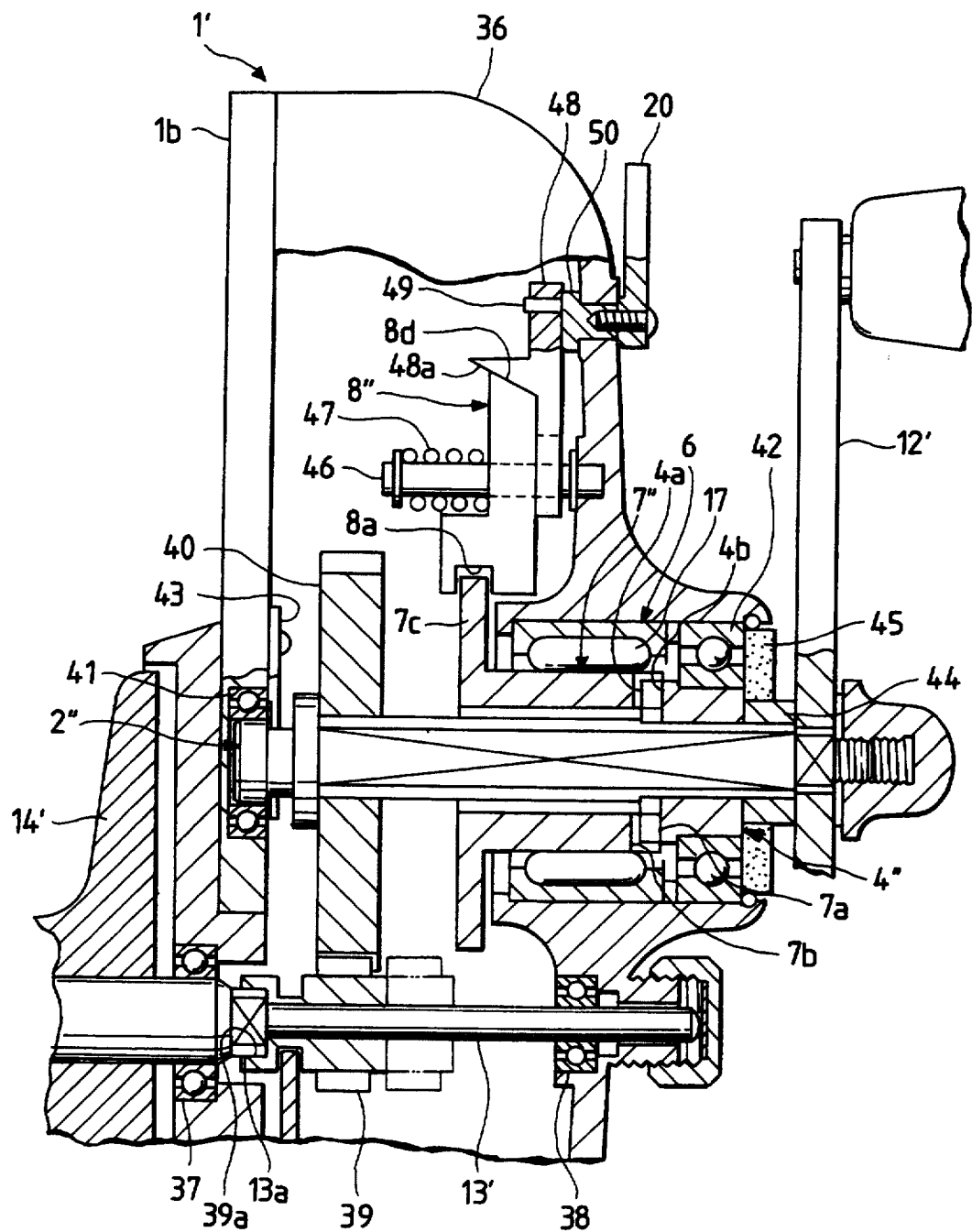
FIG. 11 is an enlarged section view of main portions of the fishing reel shown in FIG. 10.
Figure 12:
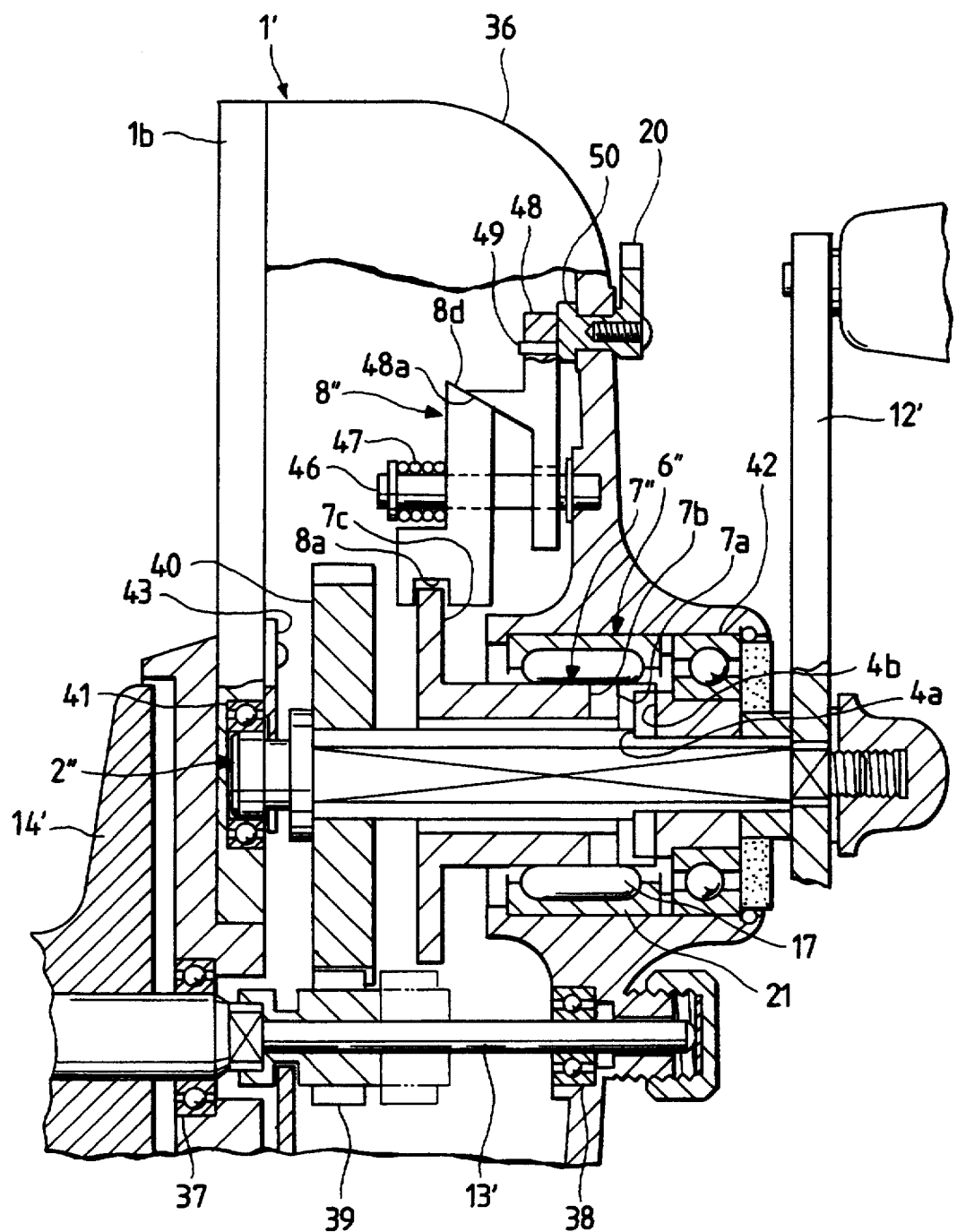
FIG. 12 is an enlarged section view of main portions of the fishing reel shown in FIG. 10, showing a state in which a spool can be rotated in the reversed direction.

Referring now to FIGS. 10 to 12, there is shown a fourth embodiment of a fishing reel according to the invention. In particular, FIG. 10 is a partially sectional plan view of a fishing reel of a double bearing type, FIG. 11 is an enlarged view of main portions of the fishing reel, illustrating a state in which a drive shaft is prevented from rotating in the reversed direction, and FIG. 12 is an enlarged view of main portions of the fishing reel, illustrating a state in which the drive shaft is allowed to rotate in the reversed direction as well. A reel main body 1' includes two right and left side frames 1a and 1b, a support member 1c, a fixing plate 1d of a reel leg 34 and a finger placing member 1e. The side frames 1a, 1b, support member 1c, fixing plate 1d and finger placing member 1e are formed integrally with one another and the two right and left side frames 1a and 1b are held in parallel to each other.

On the outsides of the two right and left side frames 1a and 1b, there are mounted reel side plates 35, 36 which respectively form the side portions of the reel main body 1'. A spool 14' is rotatably supported between the two side frames 1a and 1b, and a spool shaft 13' fixed to the spool 14' is rotatably supported by one bearing (not shown) and the other bearings 37, 38. A pinion 39 is fitted to the spool shaft 13' in such a manner that it is free to slide in the axial direction thereof, so that the engagement portion 13a of the spool shaft 13' can be engaged with and disengaged from the engagement portion 39a of the pinion 39. Also, the pinion 39 meshes with a drive gear 40 which is fitted to a drive shaft 2" in a rotation preventive manner, the drive shaft 2" being rotatable by a handle 12'.

The drive shaft 2" is supported or journaled by a bearing 41 provided in the right side frame 1b and by a bearing 42 mounted to the reel side plate 36, and the end portion of the drive shaft 2" on the side of the bearing 41 is prevented from slipping off by a check plate 43. Between the drive shaft 2" on the side of the bearing 42 and the bearing 42, a rotation-side switch-over member element 4" identical in shape with one employed in the first embodiment and shown in FIG. 3 is fitted with the drive shaft 2" in a rotation preventive manner.

A collar 44 is fitted with the portion of the drive shaft 2" extending out from the reel side plate 36, and the handle 12' is mounted to the drive shaft 2" outside the collar 44. A felt 45 is mounted to the portion of the outer periphery of the collar 44 that extends outwardly of the bearing 42. A one-way brake 6 of a radial type having the same shape as one employed in the first embodiment and shown in FIG. 4 is fitted with and fixed to the portion of the inner periphery of the reel side plate 36 that extends inwardly of the bearing 42.

The one-way brake 6 of a radial type includes rod-shaped rolling members 17. An operation-side switch-over member element 7" having the same shape as one employed in the first embodiment and shown in FIG. 3 is interposed between the inside of the rod-shaped rolling members 17 and the outer periphery of the larger diameter portion of the drive shaft 2". The rotation-side and operation-side switch-over member elements 4" and 7" include raised and recessed engagement portions 4a, 4b, 7a, 7b, respectively, similarly as in FIG. 3, and the raised leading end portions of the respective engagement portions are chamfered. Also, the operation-side switch-over member element 7" includes a flange portion 7c in the other side thereof.

Upwardly of the flange portion 7c there is disposed an operation member 8" which is slidably fitted with a shaft 46 fixed to the reel side plate 36 and is energized in the right direction by a spring 47. The operation member 8" includes in the lower portion thereof a recessed portion 8a adapted to be able to store the flange portion 7c and also includes an inclined surface 8d in the upper portion thereof. A cam surface 48a is disposed in contact with the inclined surface 8d. The cam surface 48 is formed in a cam plate 48 which is inserted through a pin 49 provided in a rotary member 50 by means of a hole formed therein. The lower portion of the cam plate 48 is divided into two portions in a manner to straddle the shaft 46. To the rotary member 50 is coupled a knob 20 which is disposed on the outside portion of the reel side plate 36.

Next, description will be given below of the operation of the fourth embodiment of the invention. As shown in FIG. 11, with the engagement portions of the rotation-side switch-over member element 4" in engagement with the engagement portions of the operation-side switch-over member element 7", if the handle 12' is rotated in a direction in which a fishing line (not shown) is wound around the spool 14', then the drive shaft 2", rotation-side switch-over member element 4", operation-side switch-over element 7" and spool 14' are rotated clockwise (in a forward direction) in FIG. 4. In this case, due to the fact that the rod-shaped rolling members 17 of the one-way brake 6 are situated in the free rotation area α of the outer frame member 21, the operation-side switch-over member element 7" can be rotated.

Thereafter, if the fishing line (not shown) wound around the spool 14' is tugged by a fish and is played out from the spool 14', then the spool 14' is reversely rotated, which tries to rotate the operation-side switch-over member element 7" reversely, that is, counter-clockwise in FIG. 4. If the operation-side switch-over member element 7" is rotated in the reversed direction, then the rod-shaped rolling members 17 of the one-way brake 6 are moved from the free rotation area α of the outer frame member 21 to the rotation preventive surface β thereof, that is, they are abutted against the rotation preventive surface β, so that the reversed rotation of the operation-side switch-over member element 7" with respect to the outer frame member 21 can be prevented due to the wedge action of the rod-shaped rolling members 17. As a result of this, the reversed rotation of the spool 14' can be stopped. Also, since the degree of play of the rod-shaped rolling member 17 is small, the reversed rotation of the spool 14' can be stopped very quickly.

As shown in FIG. 12, if the knob 20 is rotated, then the operation member 8" is moved left to move the operation-side switch-over member element 7" in the left direction along the drive shaft 2" by means of the flange portion 7c, thereby removing the engagement between the operation-side and rotation-side switch-over member elements 7" and 4". As a result of this, the rotational movements of the spool 14', drive shaft 2" and rotation-side switch-over member element 4" are not transmitted to the operation-side switch-over member element 7" and one-way brake 6, which disables the prevention of the reversed rotation due to the wedge action of the rod-shaped rolling members 17 of the one-way brake 6. In this state, the spool 14', drive shaft 2" and rotation-side switch-over member element 4" are free to rotate in the forward direction as well as in the reversed direction.

Also, if the engagement portion 13a of the spool shaft 13' is disengaged from the engagement portion 39a of the pinion 39, then the spool 14' can be rotated in both forward and reversed directions.

Next, description will be given below of a fishing reel using a modification of the switch-over member which is made up of a combination of the rotation-side switch-over member element 4 (4', 4") and operation-side switch-over member element 7 (7', 7") employed in the first to fourth embodiments of the invention.

Figure 13:
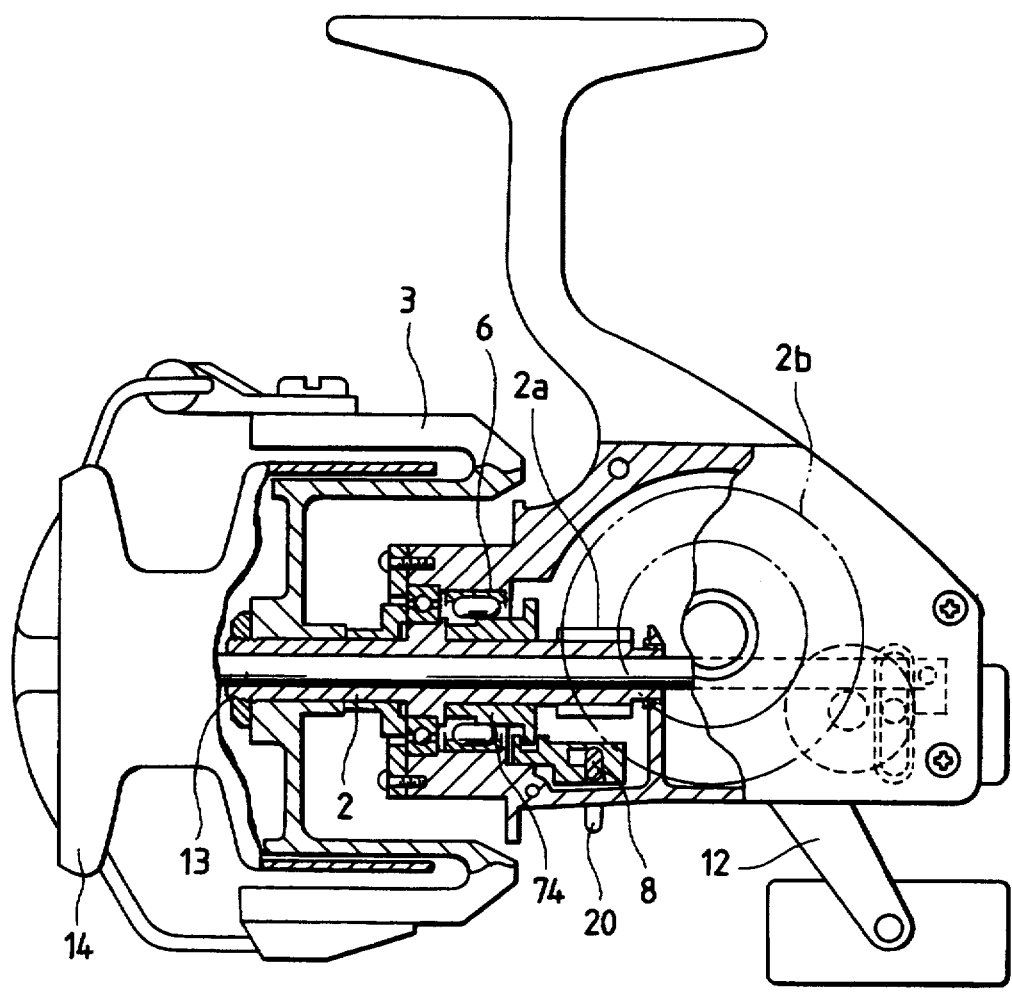
FIG. 13 is a sectional side view of main portions of a spinning reel which is a fifth embodiment of a fishing reel according to the invention.
Figure 14:
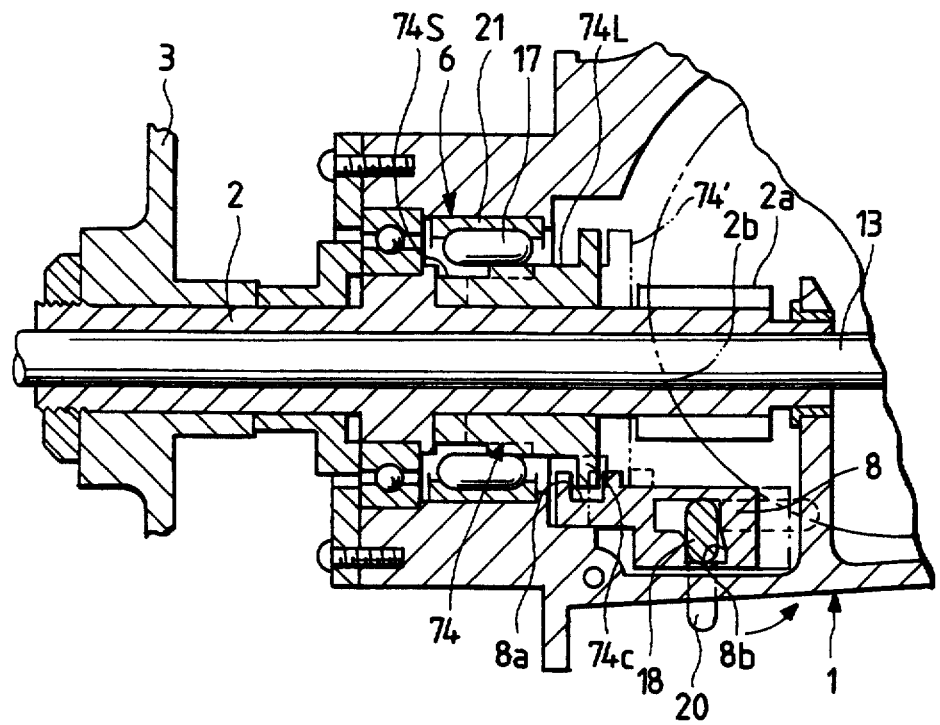
FIG. 14 is an enlarged section view of main portions of the spinning reel shown in FIG. 13.
Figure 15:
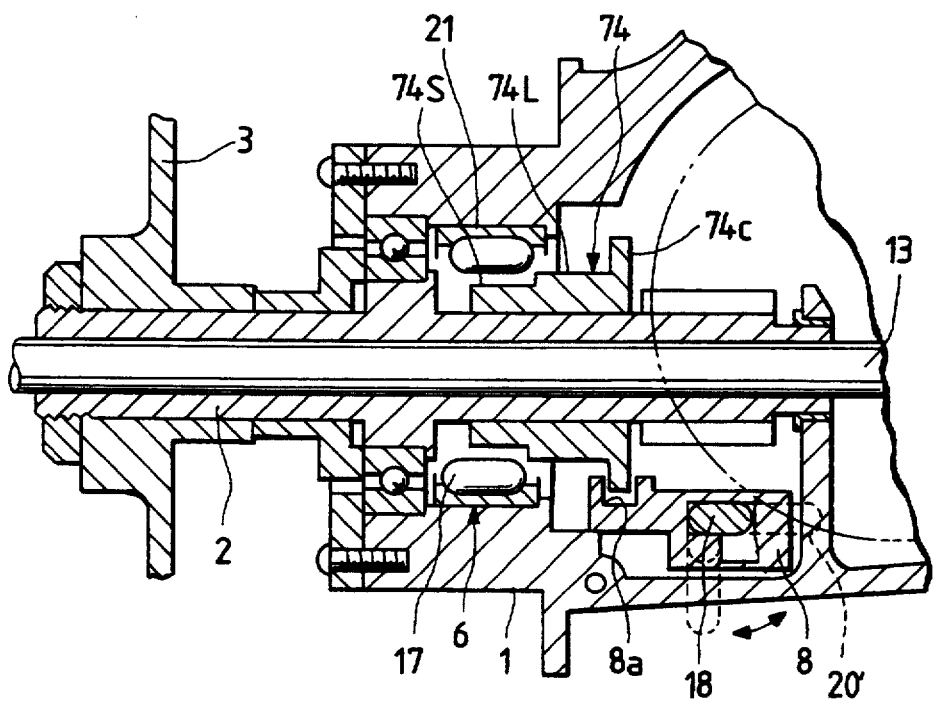
FIG. 15 is an enlarged section view of main portions of the spinning reel shown in FIG. 13, showing a state in which a rotor is rotated in the reversed direction.
Figure 16:
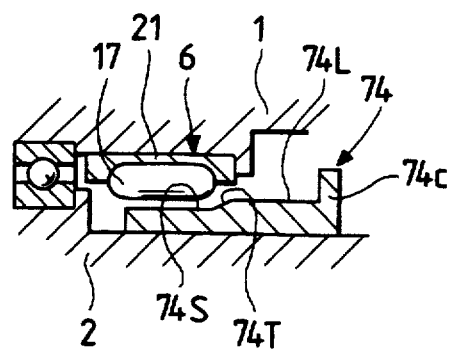
FIG. 16 is a partial view of a switch-over member employed in the spinning reel shown in FIG. 13, showing the improvements of the switch-over member.
Figure 17:
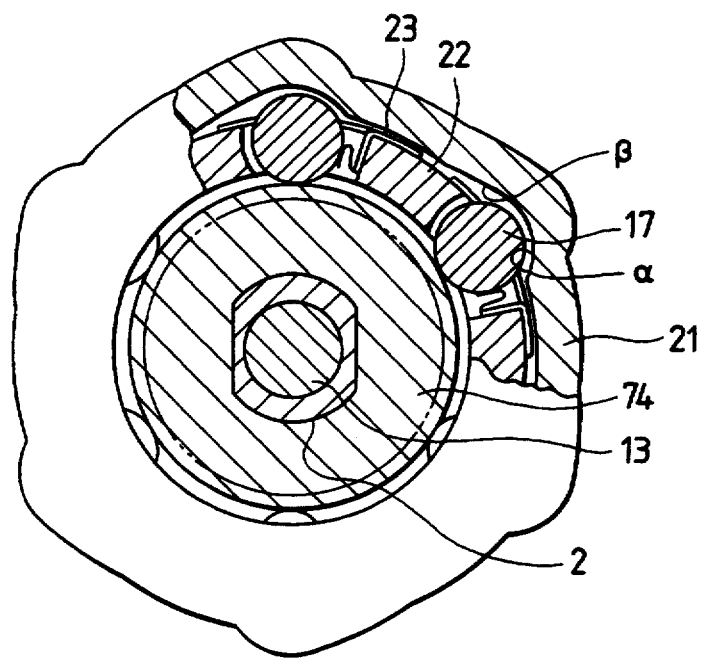
FIG. 17 is an enlarged transverse section view of main portions of the spinning reel shown in FIG. 13 including a one-way brake, viewed from the front portion of the spinning reel.

At first, in FIGS. 13 and 17, there is shown a fifth embodiment of the invention which is a modification of the first embodiment. Therefore, the same components thereof are given the same reference numerals as in the first embodiment and the portions of the fifth embodiment not specially described are similar to those of the first embodiment. In particular, FIG. 14 is an enlarged longitudinal section view of main portions of the fishing reel shown in FIG. 13, showing a state in which a rotor is prevented from rotating in the reversed direction. FIG. 15 is an enlarged longitudinal section view of main portions of the fishing reel in FIG. 13, showing a state in which a rotor is allowed to rotate in the reversed direction as well. FIG. 16 is a partial view of a modification of a switch-over member and FIG. 17 is a transverse sectional view of main portions of the fishing reel including a one-way clutch, viewed from in front of the fishing reel.

Referring to FIGS. 14 and 17, to a cylindrical drive shaft 2 having a rotor 3 mounted thereto, there is mounted a switch-over member element 74 in such a manner that it can be rotated together with the cylindrical drive shaft 2 and can be slid in the axial direction of the cylindrical drive shaft 2. The switch-over member 74 includes a flange portion 74c in the rear end portion thereof, a large diameter portion 74L in the portion thereof nearer to the flange portion 74c, and a small diameter portion 74S disposed on the opposite direction to the flange portion 74c with the large diameter portion 74L between them and having a diameter smaller than the large diameter portion 74L.

A one-way brake 6 is disposed at a position opposed to the above-mentioned switch-over member 74 and mounted to the inner peripheral surface of the reel main body 1, with the outer frame member 21 thereof being fixed to the inner peripheral surface of the reel main body 1. The large diameter portion 74L of the switch-over member 74 is formed in such a dimension as allows the rod-shaped rolling members 17 of the one-way brake 6 to be in rolling contact therewith.

On the other hand, in the lower portion of the reel main body 1, there is disposed an operation member 8 which includes a recessed portion 8a engageable with the flange portion 74c of the switch-over member 74 and also which includes a cam groove 8b in which a cam 18 is stored. In order to drive the cam 18 to thereby drive the operation member 8, a knob 20 is disposed on the outside of the reel main body 1.

If the knob 20 is rotated to a position shown by a broken line in FIG. 15, then the recessed portion 8a of the operation member 8 is brought into engagement with the flange portion 74c of the switch-over member 74 and, as the operation member 8 is moved backwardly, the switch-over member 74 is caused to retreat along the cylindrical drive shaft 2 to a position shown by a two-dot chained line in FIG. 14. The retreated state of the switch-over member 74 is shown in FIG. 15. In this state, the rod-shaped rolling member 17 of the one-way brake 6 is opposed to the small diameter portion 74S of the switch-over member 74. Therefore, the one-way brake 6 is not in contact with the switch-over member 74.

Referring to the movement of the switch-over member 74 by means of the knob 20, in order to prevent the rod-shaped rolling member 17 of the one-way brake 6 and the end of the large diameter portion 74L of the switch-over 74 from biting each other when the state shown in FIG. 15 is changed into the state shown in FIG. 14, the corner of the large diameter portion that exists in the interface position between the large diameter portion 74L and small diameter portion 74S is formed as a tapered and chamfered corner 74T as shown in FIG. 16.

Next, description will be given below of the fifth embodiment of a fishing reel according to the invention. At first, as shown in FIG. 14, when the large diameter portion 74L of the switch-over member 74 is in contact with the one-way brake 6, if the handle 12 is rotated in a direction in which a fishing line is wound, then the cylindrical drive shaft 2 is going to rotate forwardly or clockwise in FIG. 17 and the rod-shaped rolling member 17 of the one-way brake 6 is rotatable at its position in the free rotation area a of the outer frame member to thereby allow the rotation of the cylindrical drive shaft 2, so that a fishing line (not shown) can be wound around the spool 14.

After then, if the fishing line wound around the spool 14 is tugged by a fish and is played out from the spool 14, then the rotor 3 is rotated reversely, which is going to rotate the switch-over member 74 reversely, that is, counterclockwise in FIG. 17 together with the cylindrical drive shaft 2. This reversed rotation causes the rod-like rolling member 17 of the one-way brake 6 to move to the rotation preventive surface β of the outer frame member, that is, the rolling member 17 is abutted against the rotation preventive surface β to generate a wedge action to thereby prevent the reversed rotation of the switch-over member 74. As a result of this, the reversed rotation of the rotor 3 is also stopped. Since the degree of play of the rod-shaped rolling member 17 generated in the reversed direction due to the above-mentioned wedge action is small, the stop of the reversed rotation of the rotor 3 can be realized very quickly.

Further, as shown in FIG. 15, when the switch-over member 74 is not in contact with the one-way brake 6, the rotational movement of the switch-over member 74 is not transmitted to the one-way brake 6 and thus the wedge action of the rod-shaped rolling member 17 is not generated, so that the reversed rotation is not prevented. As a result of this, the rotor 3, cylindrical drive shaft 2 and switch-over member 74 can be freely rotated in both of the forward and reversed directions.

Figure 18:
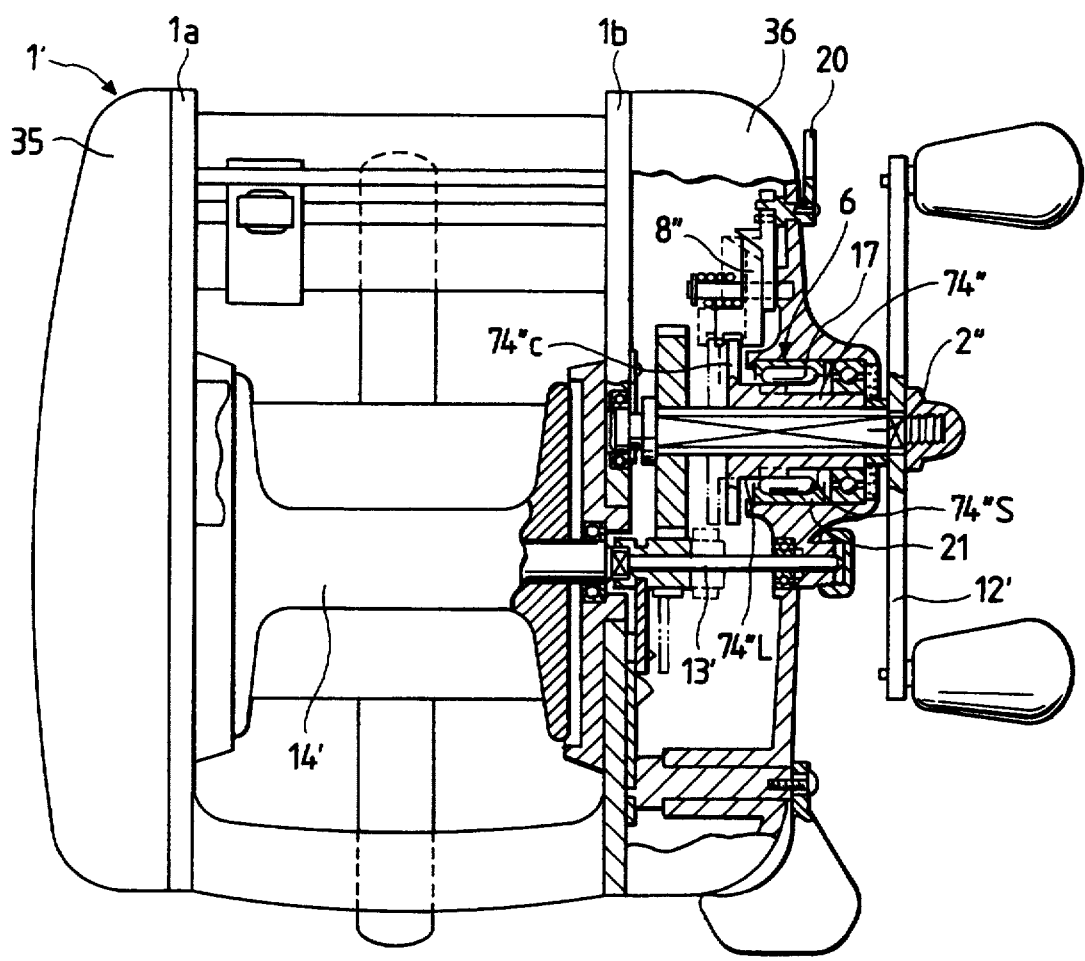
FIG. 18 is a sectional plan view of main portions of a fishing reel of a double bearing type which is a sixth embodiment of a fishing reel according to the invention.

Now, referring to FIG. 18, there is shown a sixth embodiment of a fishing reel according to the invention, illustrating a modification in which the switch-over member 74 employed in the fifth embodiment is applied to the fourth embodiment. Therefore, the same parts as those employed in the fourth embodiment are given the same designations and the portions of the sixth embodiment that are not specially described below are similar to the fourth embodiment. In the sixth embodiment, a drive shaft 2" can be rotated as a handle 12' is rotated and, a switch-over member 74" is mounted to the drive shaft 2" in such a manner that it can be rotated together with the drive shaft 2" and also can be slid in the axial direction of the drive shaft 2".

On the other hand, a one-way brake 6 is mounted to the inner periphery of a reel side plate 36 forming a part of a reel main body 1' and at a position opposed to the switch-over member 74". The one-way brake 6 includes an outer frame member 21 which is fixed to the inner surface of the reel side plate 36. Also, the switch-over member 74" includes a flange portion 74"c, a large diameter portion 74"L and a small diameter potion 74"S which decrease in diameter sequentially from left in FIG. 18. The large diameter portion 74"L is arranged in such a dimension as allows itself to be in contact with a rod-shaped rolling member 17 provided in the one-way brake 6.

Also, the flange portion 74"C, similarly as in the fourth embodiment, is engageable with an operation member 8". If a knob 20 is rotated, then the operation member 8" is moved. As the operation member 8" is moved, the switch-over 74" is moved right and left along the drive shaft 2". If the switch-over member 74" is moved left, the rod-shaped rolling member 17 of the one-way brake 6 is opposed to the small diameter portion 74"S of the switch-over member 74", so that the rotational movement of the switch-over member 74" cannot be transmitted to the one-way brake 6.

Therefore, when the switch-over member 74" is in contact with the rod-shaped rolling member 17 as shown in FIG. 18, if the handle 12' is rotated forwardly, then the spool 14' is rotated forwardly, so that a fishing line (not shown) can be wound around the spool 14'. Also, if the fishing line wound around the spool 14' is tugged by a fish and is played out from the spool 14', then the spool 14' is going to rotate reversely. The reversed rotation of the spool 14' is transmitted to the drive shaft 2" and switch-over member 74", but the reversed rotation is prevented by the wedge action of the rod-shaped rolling member 17 of the one-way brake 6. For this reason, the reversed rotation of the spool 14' is stopped.

The degree of play of the rod-shaped rolling member 17 generated due to its wedge action in the reversed rotation is small and, for this reason, the reversed rotation of the spool can be stopped very quickly.

Further, when the switch-over member 74" is not in contact with the one-way brake 6 as shown by a two-dot chained line in FIG. 18, then the rotational movement of the switch-over member 74" is not transmitted to the one-way clutch 6 and, therefore, the rod-shaped rolling member 17 fails to generate its wedge action and thus the reversed rotation cannot be prevented. Accordingly, in this state, the spool 14', drive shaft 2" and switch-over member 74" can be freely rotated in both forward and reversed directions.

In addition to the above-mentioned embodiments 5 and 6, similar modifications are also possible with respect to the second and third embodiments of the invention. Although in the foregoing description the spinning reel and the fishing reel of a double bearing type have been described, the present invention can also apply to other types of fishing reels such as a fishing reel of a single bearing type and the like.

Figure 19:
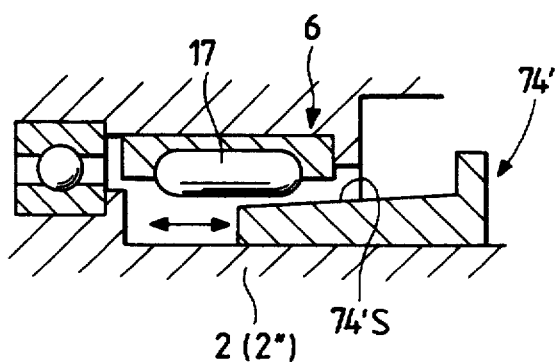
FIG. 19 is a sectional view of a major part of modification for the fifth and sixth embodiments of the present invention.

Again, in the above-mentioned fifth and sixth embodiments shown in FIGS. 13 to 18, the configuration of the switch-over member 74,74" should not be restricted thereto or thereby. Various modification could be applied to the present- invention as far as the switch-over member selectively transmit the rotational torque from the drive shaft to the one-way brake. For example, as shown in FIG. 19, the switch-over member may have a tapered outer peripheral surface. With the axial motion of the switch-over member 74' relative to the drive shaft 2,2", the tapered outer peripheral surface 74'S is brought into contact with the rolling member 17 so as to transmit the rotational torque from the drive shaft 2,2" to the one-way brake 6, and is deviated from the rolling member 17 so as to functionally separate the one-way brake 17 to the drive shaft 2,2".

As can be clearly understood from the foregoing description, according to the invention, a reversed rotation can be prevented with the degree of play reduced and a switch-over member disposed on a drive shaft can be switched in such a manner that rotation is possible in both forward and reversed directions as need arises. Thanks to this, the present invention can supply a simple and highly reliable fishing reel.

What is claimed is:

1. A fishing reel comprising:
   a reel main body defining an inside and an outside;
   a drive shaft connected to a reel handle, whereby a rotation of said handle causes rotation of said drive shaft;
   a one-way brake fixedly mounted to said reel main body and interposed between said reel main body and said drive shaft;
   a switch-over means interposed between said drive shaft and said one-way brake for selectively switching between an engaged position in which said one-way brake is connected to said drive shaft and wherein said drive shaft is permitted to rotate in a first direction and prevented from rotating in e second direction opposite from said first direction, and a disengaged position in which said one-way brake is disengaged from said drive shaft and wherein said drive shaft is permitted to rotate in both said directions; and
   an operation means for performing the switching operation of said switch-over means between said engagement and disengagement positions, said operation means being adapted to be operated from the outside of said reel main body.

2. A fishing reel as set forth in claim 1, wherein said switch-over means is movably mounted on said drive shaft and adapted to contact with a rolling member provided in said one-way brake, said switch-over means adapted to selectively engage said drive shaft by movement of said switch-over means in an axial direction of said drive shaft wherein said switch-over means rotates together with said drive shaft in said engaged position.

3. A fishing reel as set forth in claim 1, wherein said switch-over means is disposed on said drive shaft, said switch-over means being adapted to rotate with said drive shaft and slide in the longitudinal direction of said drive shaft, said switch-over means comprising a large diameter portion adapted to contact and engage with a rolling member provided in said one-way brake and a small diameter portion adapted to not engage with said rolling member, wherein said operation means is adapted to move said switch-over means in said longitudinal direction.

4. A fishing reel as set forth in claim 1, wherein said drive shaft is adapted to rotate a rotor provided on said fishing reel.

5. A fishing reel as set forth in claim 1, wherein said drive shaft is adapted to rotate a spool of said fishing reel, said fishing reel being a double bearing type.

6. A fishing reel as set forth in claim 1, wherein said one-way brake and said switch-over means are provided in a gear box of said reel main body.

7. A fishing reel as set forth in claim 1, wherein said switch-over means is disposed on said drive shaft, said switch-over means being adapted to rotate with said drive shaft and slide in the longitudinal direction of said drive shaft, said switch-over means comprising a tapered outer peripheral surface adapted to selectively contact with a rolling member of said one-way brake.

8. A reverse rotation preventive device for a fishing reel having a drive shaft adapted to rotate with a handle for winding a fishline onto a spool provided on a reel main body, said device comprising:
   a one-way brake provided around said drive shaft; and
   a switch-over means for selectively switching between an engaged position in which said one-way brake is coupled to said drive shaft wherein said drive shaft is permitted to rotate in a first direction and prevented from rotating in a second direction opposite from said first direction, and a disengaged position in which said one-way brake is disengaged from said drive shaft wherein said drive shaft is permitted to rotate in both said directions, said switch-over means being adapted to move in an axial direction of said drive shaft, wherein said one-way brake is fixed to said reel main body at a radial distance from said drive shaft, and said switch-over means is non-rotatably mounted on said drive shaft and movable in said axial direction so as to selectively couple said one-way brake to said drive shaft in said radial distance.

9. The device according to claim 8, wherein said one-way brake is fixed to said reel main body at a radial distance from said drive shaft, said switch-over means comprising a first element mounted on said drive shaft and adapted to rotate together with said drive shaft, and a second element provided in said radial distance, said second element being in contact with said one-way brake and adapted to move in said axial direction to selectively engage with said first element to rotate together.

10. The device according to claim 8, wherein said switch-over means comprises first and second members, said first member being non-rotatively mounted on said drive shaft and said second member being movable in said axial direction to couple with said first member to rotate together therewith.

11. The device according to claim 10, wherein said switch-over member comprising a small diameter portion prevented from contacting with said one-way brake and a large diameter portion adapted to contact said one-way brake in said radial distance.

12. The device according to claim 10, wherein said switch-over means is formed with a tapered outer peripheral surface to selectively contact with said one-way brake.

* * * * *